(12) United States Patent
Yeo

(10) Patent No.: US 6,711,741 B2
(45) Date of Patent: *Mar. 23, 2004

(54) RANDOM ACCESS VIDEO PLAYBACK SYSTEM ON A NETWORK

(75) Inventor: Boon-Lock Yeo, Sunnyvale, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/288,047

(22) Filed: Apr. 7, 1999

(65) Prior Publication Data

US 2003/0088646 A1 May 8, 2003

(51) Int. Cl.⁷ .......................... H04N 7/173; G06F 15/16
(52) U.S. Cl. .............................. 725/87; 725/91; 725/93; 725/88; 709/217; 709/218; 709/219
(58) Field of Search ................... 725/87, 91, 93; 709/217, 218, 219; 348/564, 565, 333.05; 345/838, 853, 723, 721, 719, 749; 386/1, 45, 83, 125, 126

(56) References Cited

U.S. PATENT DOCUMENTS

| | | | | |
|---|---|---|---|---|
| 5,821,945 A | * | 10/1998 | Yeo et al. | 345/440 |
| 5,884,056 A | * | 3/1999 | Steele | 395/339 |
| 5,905,988 A | * | 5/1999 | Schwartz et al. | 707/104 |
| 5,917,492 A | * | 6/1999 | Bereiter et al. | 345/357 |
| 5,963,204 A | * | 10/1999 | Ikeda et al. | 345/328 |
| 5,995,095 A | * | 11/1999 | Ratakonda | 345/328 |
| 6,026,389 A | * | 2/2000 | Nakajima et al. | 707/1 |
| 6,154,771 A | * | 11/2000 | Rangan et al. | 709/217 |
| 6,161,132 A | * | 12/2000 | Roberts et al. | 709/219 |
| 6,166,735 A | * | 12/2000 | Dom et al. | 345/339 |
| 6,175,862 B1 | * | 1/2001 | Chen et al. | 709/218 |
| 6,219,837 B1 | * | 4/2001 | Yeo et al. | 725/38 |
| 6,222,532 B1 | * | 4/2001 | Ceccarelli | 345/328 |
| 6,226,030 B1 | * | 5/2001 | Harvey et al. | 348/7 |
| 6,317,141 B1 | * | 11/2001 | Pavley et al. | 345/732 |
| 6,366,899 B1 | * | 4/2002 | Kernz | 707/1 |
| 6,380,950 B1 | * | 4/2002 | Montgomery et al. | 345/723 |
| 6,408,128 B1 | * | 6/2002 | Abecassis | 386/68 |
| 6,415,326 B1 | * | 7/2002 | Gupta et al. | 709/231 |
| 6,463,297 B1 | * | 10/2002 | Lee et al. | 455/550.1 |
| 6,539,429 B2 | * | 3/2003 | Rakavy et al. | 709/224 |
| 6,542,692 B1 | * | 4/2003 | Houskeeper | 386/52 |
| 6,549,942 B1 | * | 4/2003 | Janky et al. | 709/219 |

* cited by examiner

*Primary Examiner*—John Miller
*Assistant Examiner*—Annan Q. Shang
(74) *Attorney, Agent, or Firm*—Blakely, Sokoloff, Taylor & Zafman LLP

(57) ABSTRACT

A method and apparatus of previewing and playing back source video frames is disclosed.

In one embodiment, temporal snapshots of said source video frames are generated and are stored along with said source video frames on a server, wherein each of said temporal snapshots corresponds to a segment of said source video frames. Then said server transmits said temporal snapshots to its client. Said temporal snapshots are presented as individual images to a user on said client. Said user can then browse through and randomly select said images and playback corresponding said segments of said source video frames independent from downloading or playing back said source video frames from said server.

29 Claims, 6 Drawing Sheets

RANDOM ACCESS VIDEO PLAYBACK SYSTEM ON A NETWORK

FIELD OF THE INVENTION

This invention relates to digital video technologies generally and particularly to electronic systems capable of interactively and randomly playing back digital video on a network.

BACKGROUND OF THE INVENTION

As internet and intranet become prevalent mediums for digital video transmission, their lack of network bandwidth, especially in the case of the internet, is ever more apparent. Due to this and other limitations, users today generally avoid downloading digital video from the World Wide Web (hereinafter "the web").

In addition to the network's lack of bandwidth for transferring the typically sizable video clips, accessing video clips on the web generally requires a user to download or playback the entire clip before the user can assess the clip's importance and relevance. Even when video information is downloaded, the information is limited to sequential playback. This frame-sequential fashion of viewing video clips further restrains the user's ability to quickly locate material of interest.

Therefore, in order to encourage people to download or playback video information on a network, especially on the internet, a method and apparatus is needed to compensate for the aforementioned problems associated with accessing video on the network.

SUMMARY OF THE INVENTION

A method and apparatus of previewing and playing back source video frames is disclosed.

In one embodiment, temporal snapshots of the source video frames are generated and are stored along with the source video frames on a server, wherein each of the temporal snapshots corresponds to a segment of the source video frames. Then the server transmits the temporal snapshots to its client. The temporal snapshots are presented as individual images to a user on the client. The user can then browse through and randomly select the images and playback the corresponding segments of the source video frames independent from downloading or playing back the source video frames from the server.

BRIEF DESCRIPTION OF THE DRAWINGS

The present invention is illustrated by way of example and is not limited by the figures of the accompanying drawings, in which like references indicate similar elements, and in which.

DETAILED DESCRIPTION

A method and apparatus of previewing and playing back source video frames is described. In the following description, numerous specific details are set forth, such as internet, etc. in order to provide a thorough understanding of the present invention. However, it will be apparent to one of ordinary skill in the art that the invention may be practiced without these particular details. In other instances, well-known elements and theories such temporal snapshots, shots, client, server, data path, internet, the web, video frames, etc. have not been discussed in special details in order to avoid obscuring the present invention. The phrase, "video clip", is used throughout the following discussion to describe a collection of continuous video frames.

Figure 1:
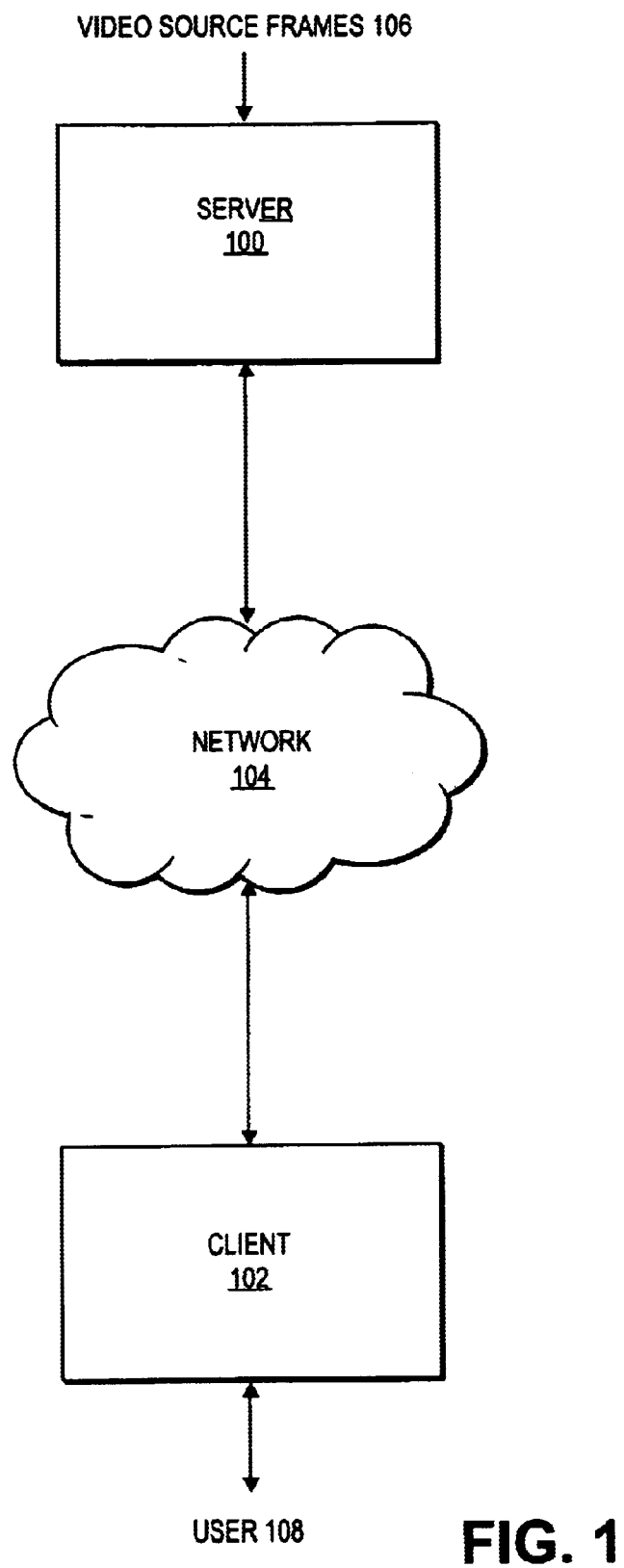
FIG. 1 illustrates a general block diagram of one embodiment of Random Access Playback System.
Figure 2:
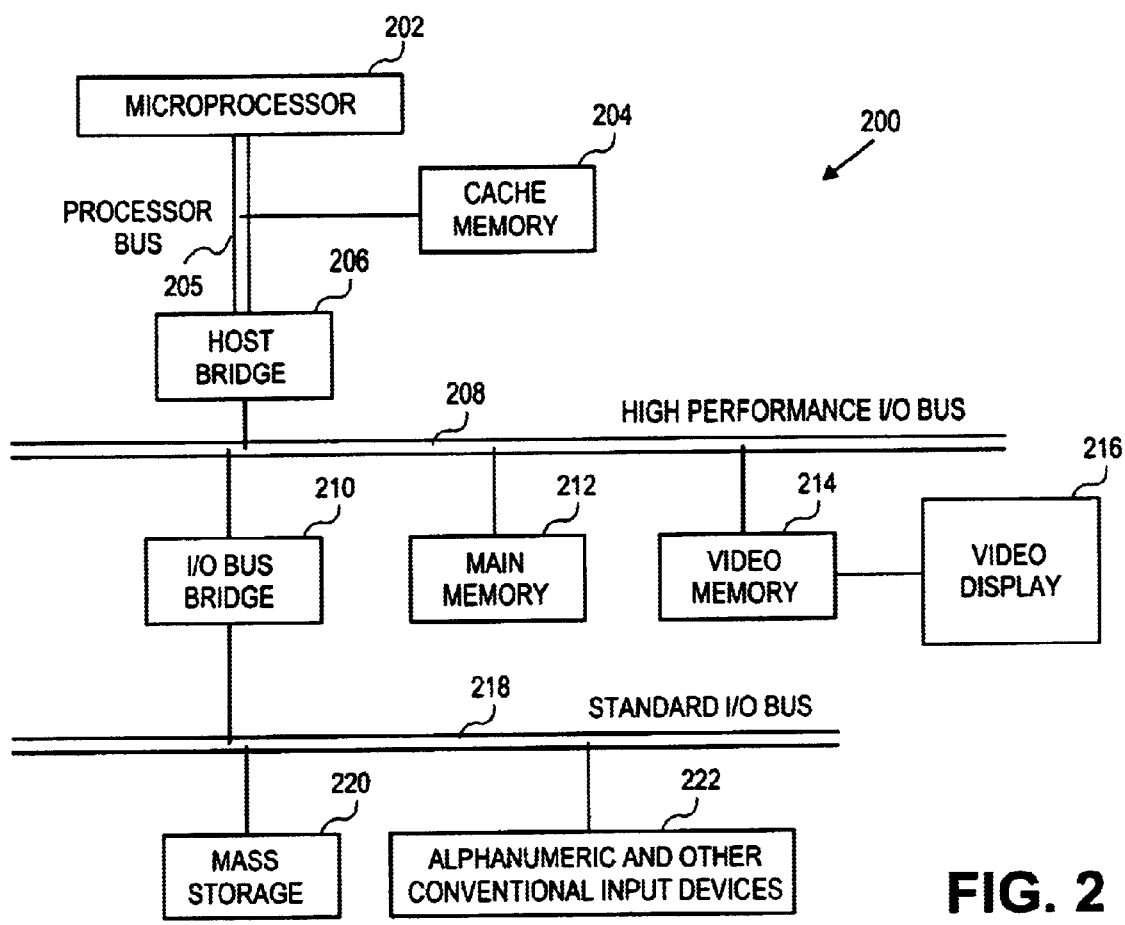
FIG. 2 illustrates a general-purpose computer system architecture.

FIG. 1 demonstrates a general block diagram of one embodiment of the Random Access Playback System (or hereinafter referred to as RAPS). At lease one server 100 and at least one client 102 are connected through network 104. Source video frames 106 are inputs to server 100, and user 108 interacts with client 102. Both server 100 and client 102 can be programmed or implemented in an electronic system or in multiple electronic systems. Some examples of the electronic system are, but not limited to, standalone electronic apparatuses and general-purpose computer systems. A general-purpose computer system 200 is illustrated in FIG. 2.

The general-purpose computer system architecture comprises microprocessor 202 and cache memory 204 coupled to each other through processor bus 205. Sample computer system 200 also includes high performance I/O bus 208 and standard I/O bus 218. Processor bus 205 and high performance I/O bus 208 are bridged by host bridge 206, whereas high performance I/O bus 208 and standard I/O bus 218 are bridged by I/O bus bridge 210. Coupled to high performance I/O bus 208 are main memory 212 and video memory 214. Alternatively, main memory 212 can also be coupled to host bridge 206. Coupled to video memory 214 is video display 216. Additionally, a video processing device may also be coupled to host bridge 206. Coupled to standard I/O bus 218 are mass storage 220, network interface 224, and alphanumeric input device or other conventional input device 222.

These elements perform their conventional functions well known in the art. In particular, mass storage 220 may be used to provide permanent storage for the executable instructions for an embodiment of the present invention, whereas main memory 212 may be used to temporarily store the executable instructions of an embodiment of the present invention during execution by microprocessor 202. Although certain components and their arrangements within a system have been described above, it should be apparent to one ordinarily skilled in the art to implement the present invention with more or less components in different arrangements without exceeding the scope of the invention.

Overview of System

RAPS previews and plays back source video frames. Specifically, RAPS first generates temporal snapshots of the source video frames and then maintains both the temporal snapshots and the source video frames in its server. After the server transmits the temporal snapshots to a client in RAPS, the client presents these temporal snapshots as individual images to a user. Moreover, RAPS allows the user to browse through and randomly select from these images. When the user chooses an image, RAPS plays back the selected image's corresponding segment of the source video frames independent from other downloading or playing back of the source video frames. As a result, the user can preview segments of the source video frames before depleting precious network bandwidths to download the entire source video frames. At the same time, the server needs only to maintain one copy of the source video frames.

Figure 3:
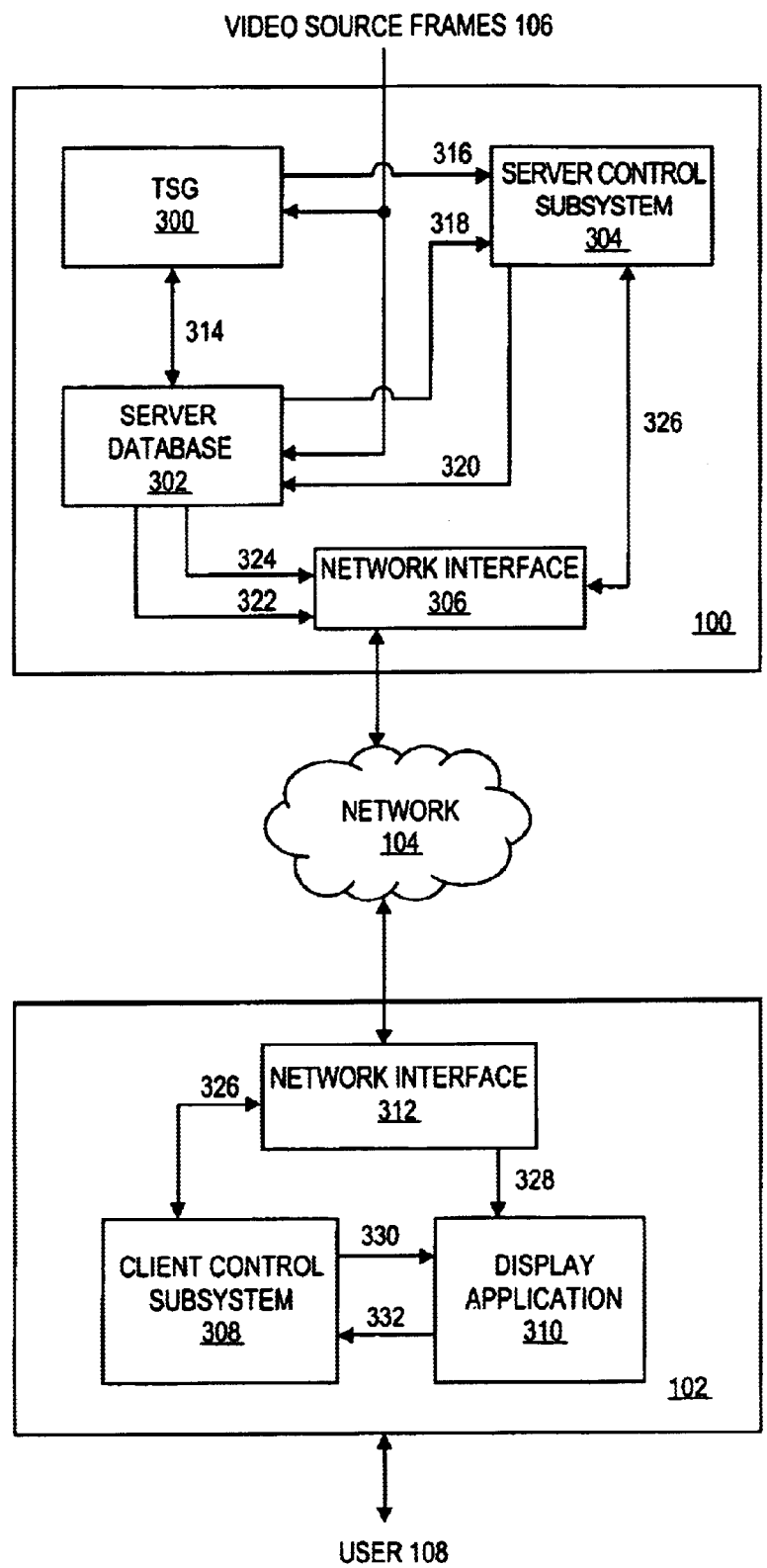
FIG. 3 illustrates a detailed block diagram of one embodiment of Random Access Playback System.

One embodiment of RAPS operates on an electronic system or in particular, general-purpose computer 200. FIG. 3 further describes various components of the embodiment illustrated in FIG. 1. These components are temporal snapshot generator 300 (or hereinafter referred to as TSG 300), server database 302, server control subsystem 304, network interface 306, client control subsystem 308 and client display application 310. It should be noted that server 100, client 102, source video frames 106 and user 108 in FIG. 3 are the same as shown in FIG. 1.

Figure 4:
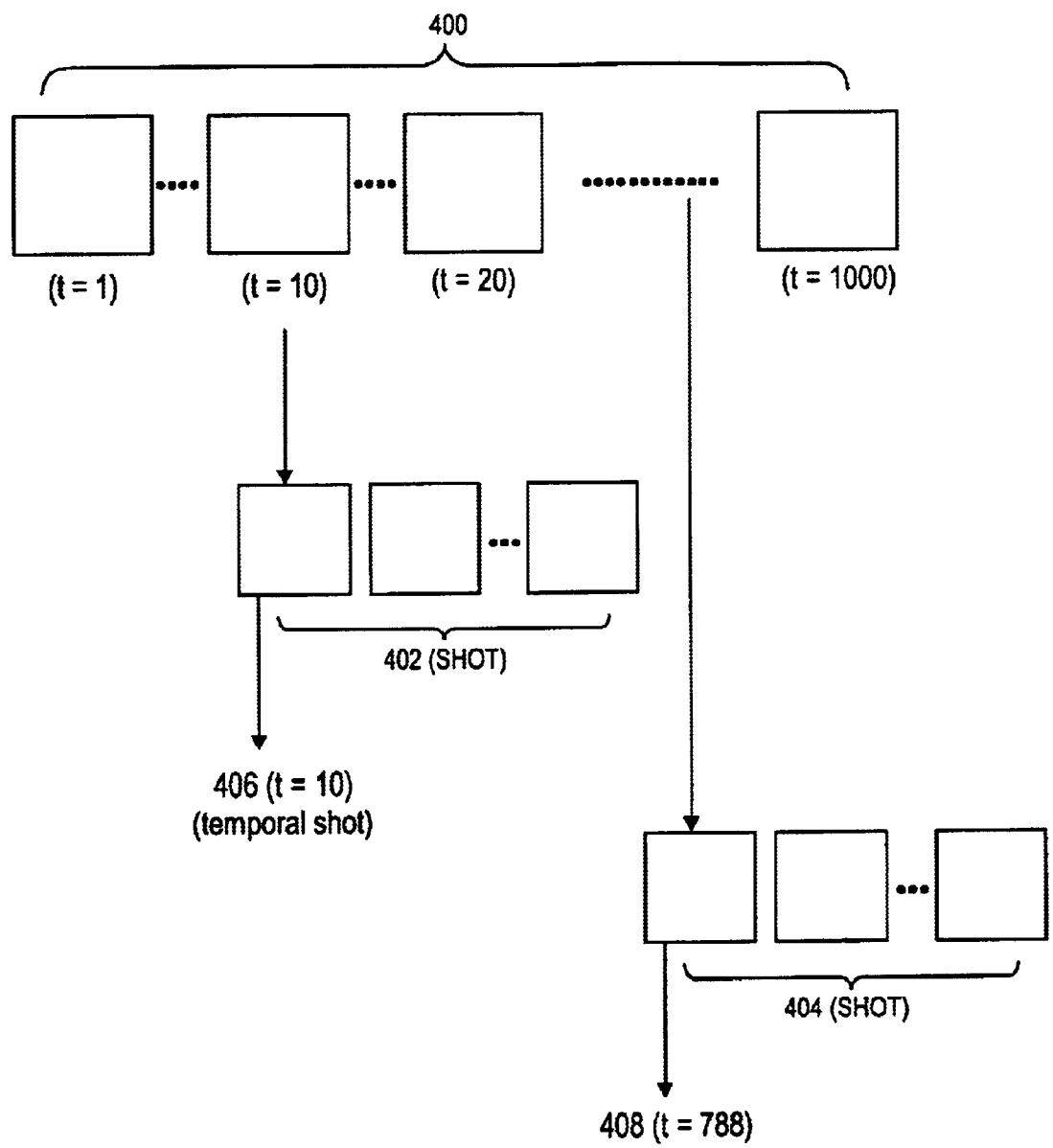
FIG. 4 illustrates examples of continuous video frames, a shot and a temporal snapshot.

Referring to FIG. 3, TSG 300 receives video source frames 106 as its input. These video frames can be from a promotional campaign video clip, a movie or a training video clip, to name just a few examples. Assuming the video source frames are those depicted in FIG. 4, TSG 300 generates shots, such as shots 402 and 404, and their corresponding temporal snapshots, such as temporal snapshots 406 and 408 from consecutive video frames 400. A shot is defined to be a sequence of images captured between a "record" and "stop" camera operation, or in other words, a segment of video source frames 106. A temporal snapshot, on the other hand, marks the beginning of a shot. One method of tracking these video frames and temporal snapshots is placing unique time stamps on them. For instance, temporal snapshot 406 is a video frame at time=10.

After having generated temporal snapshots 406 and 408, TSG 300 sends them along with video source frames 106 to server database 302 through data path 314. Both TSG 300 and server database 302 report their statuses to server control subsystem 304 through signal paths 316 and 318, respectively. These status signals can be, but are not limited to, temporal snapshots ready for transfer, data entry ready for transmission, flood control enabled, etc. In addition to receiving status signals, server control subsystem 304 can also receive client 102's requests through network interface 306 and signal path 326. Based on its inputs, server control subsystem 304 determines when to transmit information to client 102 by issuing commands to server database 302 and network interface 306 through signal paths 320 and 326, respectively. In response to the commands from server control subsystem 304, server database 302 sends source video frames 106 through data path 324 and temporal snapshots through data path 322 to client 102.

It is important to note that although one embodiment of server 100 has been described, it should be apparent to one ordinarily skilled in the art to design and implement server 100 differently and still remain within the scope of the disclosed RAPS. For example, the various illustrated components within server 100 can be standalone components. Server database 302 and TSG 300 can physically reside on different electronic systems. Furthermore, server 100 may contain additional components, signal paths and data paths than what has been demonstrated in FIG. 3.

Similar to server 100, client 102 also operates on an electronic system or in particular, general-purpose computer 200. As FIG. 3 shows, client 102 comprises components such as network interface 312, client control subsystem 308 and display application 310. Network interface 312 passes along information such as temporal snapshots to display application 310 through data path 328. Display application 310 communicates with client control subsystem 308 through signal paths 330 and 332. Client control subsystem 308 communicates with server 100 through signal path 326 and network interface 312. In one particular scenario, when display application 310 requests to playback a particular segment of video source frames 106, client control subsystem 308 responds to display application 310's request by notifying server 100 through signal path 326 and network interface 312. It should be noted that depending on the configuration of network 104, client 102's network interface 312 might be the same as server 100's network interface 306.

Figure 5:
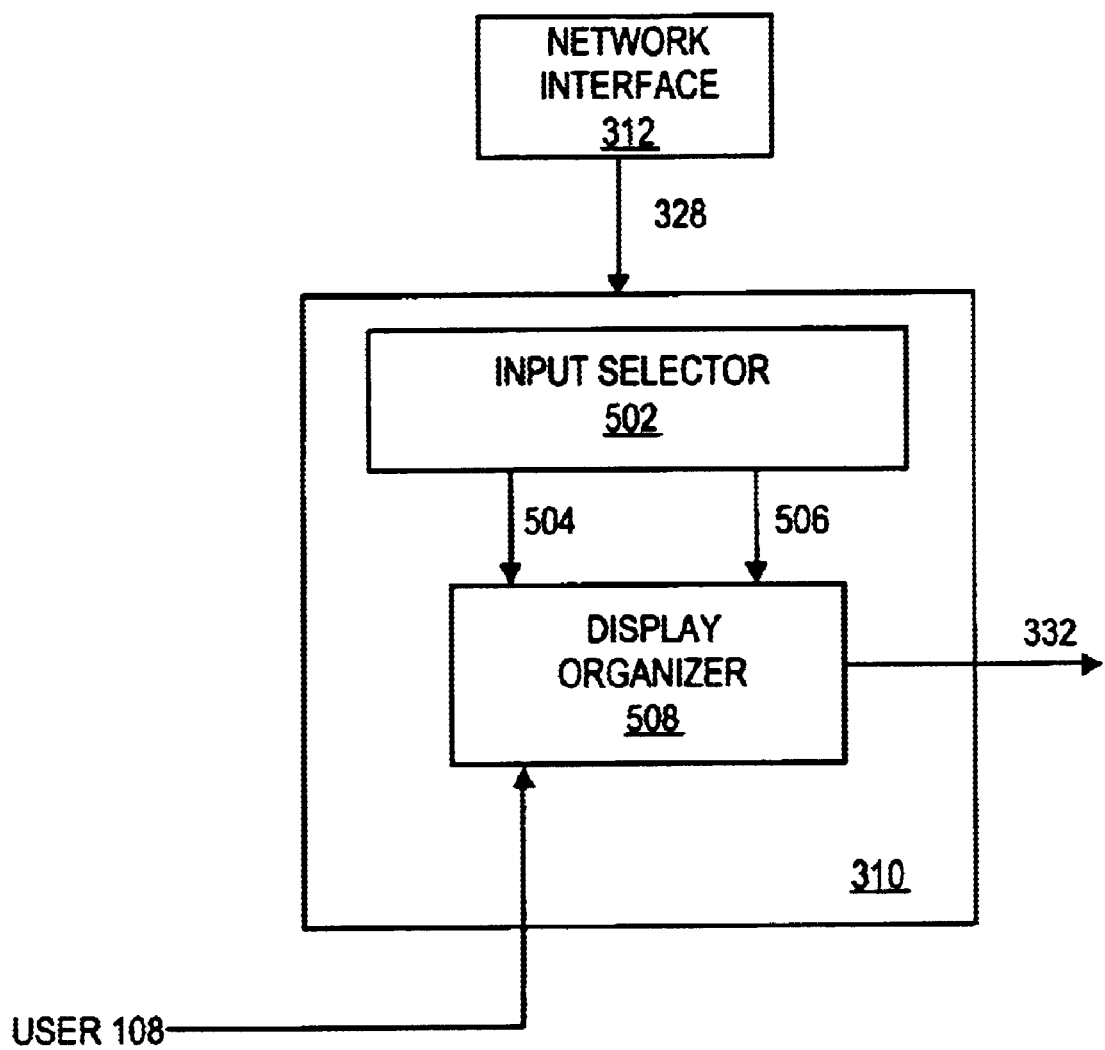
FIG. 5 illustrates a general block diagram of display application.

FIG. 5 further demonstrates one embodiment of display application 310. Display application 310 comprises input selector 502 and display organizer 508. Input selector 502 receives input data through data path 328 as illustrated in FIG. 3, and proceeds to determine whether the input data are temporal snapshots or continuous video frames. After having differentiated between the two types of input data, input selector 502 then transfers the data through different data paths, 504 and 506, to display organizer 508. It should be apparent to one ordinarily skilled in the art to recognize that input selector 502 may receive two separate input data, one for temporal snapshots and one for continuous video frames. In that instance, input selector 502 may simply pass the data through without processing them.

It should be further emphasized that display application 310 is capable of processing temporal snapshots and continuous video frames independently. In particular, when display application 310 only receives temporal snapshots but does not receive any continuous video frames, display application 310 still proceeds to display the temporal snapshots as individual images. In another situation, display application 310 receives both temporal snapshots and continuous video frames. Display application 310 can either display temporal snapshots only and wait for user 108's request for displaying continuous video frames, or display both temporal snapshots and continuous video frames together. In one embodiment where client 102 operates on general purpose computer 200 as shown in FIG. 2, display application 310 displays the aforementioned video information on video display 216.

Figure 6A:
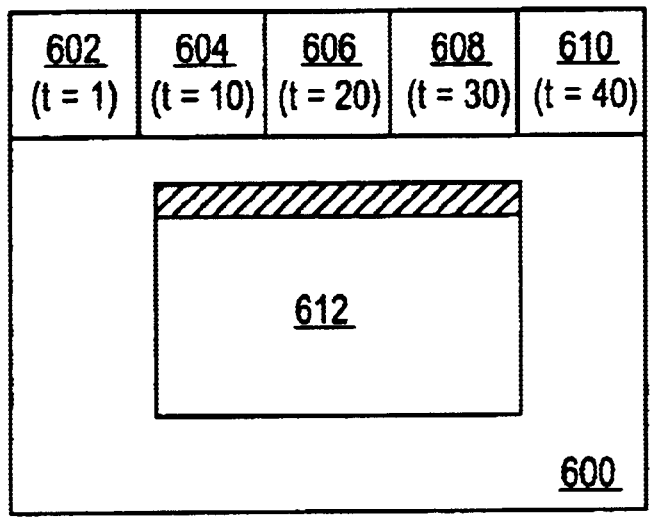
FIG. 6(a) illustrates a first arrangement of an application window.
Figure 6B:
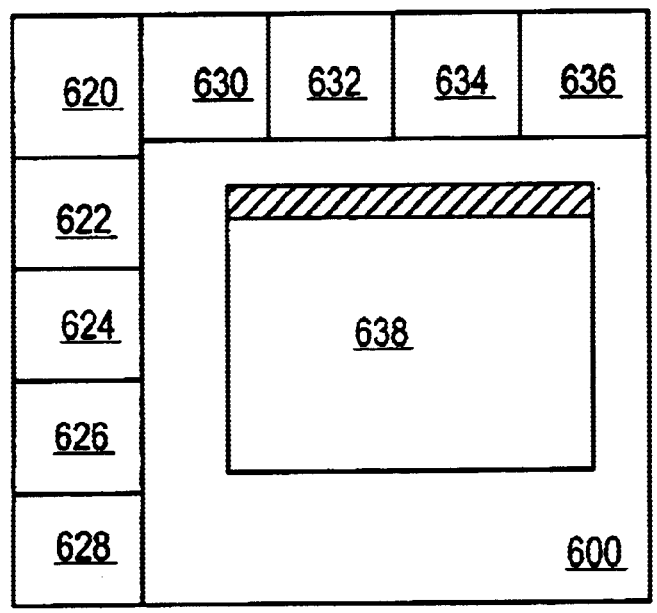
FIG. 6(b) illustrates a second arrangement of an application window.

FIGS. 6(*a*) and 6(*b*) in conjunction with FIG. 5 further illustrate the output format and the interactive functionality of display application 310. Specifically, after display organizer 508 receives input information from data paths 504 and 506, it organizes the information and presents it in one application window 600. An example of application window 600 is, but not limited to, a web browser. One arrangement shown in FIG. 6(*a*) has temporal snapshots as images 602–610 on the top of application window 600 and media player 612 in the middle of it. User 108 can select from image 608 in application window 600 through some input device, such as an alphanumeric input device, a mouse, a touch screen, or a voice recognition input device. The user selection signals display organizer 508 to request for image 608's corresponding segment of source video frames 106 from server 100.

As has been discussed previously, one of the methods RAPS employs to track temporal snapshots is time stamping each snapshot. Thus, in one embodiment of RAPS, server 100 responds to client 102's selection of image 608 at time=30 by sending the corresponding segment of source video frames 106 beginning at time=30 to client 102. Client 102 can either wait until the completion of the transmission from server 100 before playing back the frames at media player 612 or playback the frames as they're received.

Media player 612 can also provide a user options such as "Previous frame" and "Next frame" to single step through the playback sequence. Therefore, instead of viewing the entire source video frames 106, a user using RAPS can quickly browse through images 602–610 to establish the relevance of source video frames 106. If any of the images interests the user, the user can investigate further by viewing one or multiple segments of source video frames 106.

It should be noted that some buffering scheme is often needed to guarantee smooth playback of video in a network transmission scenario. Specifically, as a client on the network receives video information, its buffering scheme may use memory to store some small duration of the received video information, typically in the order of a few seconds. When appropriate, the client retrieves the video information from this memory and plays the information back. For instance, if jitters occur (e.g., dropped packets, corrupted date, etc.) during the network transmission, the stored segment of video information in memory allows for a smooth playback. Otherwise, such jitters tend to result in jerky pauses or artifacts in the playback.

However, the mentioned buffering mechanism is likely to introduce delay. In particular, when video information is only played back sequentially, playing back the stored video information first before playing back live video information creates a delay. But the delay only happens at the beginning of playback. On the other hand, in an interactive and randomly accessible environment, the delay can occur for each request for playback starting from a different temporal shot. Consequently, the accumulation of multiple delays can become intolerable.

In addressing the potential delay issue mentioned above, in one embodiment, while user 108 examines temporal snapshots 602 through 610, client 102 comprises an intelligent prefetcher to request for the first N seconds of video information corresponding to temporal snapshots 602 through 610. When user 108 actually selects temporal snapshot 604, client 102 plays back the first N seconds of video information corresponding to 604 and already stored locally. At the same time, client 102's prefetcher requests for additional video information starting at N+10 seconds from server 100. As a result, user 108 at client 102 is still able to enjoy seamless interactivity due to the intelligent prefetch of video information.

It should further be noted that in one embodiment, when application window 600 initially executes, its media player 612 may or may not be active. More specifically, in one instance, media player 612 may simply be idle. In another instance, media player 612 may be playing back the entire video source frames 106. In yet another instance, media player 612 may be in the process of downloading the entire video source frames 106. In any of the mentioned scenarios, the user has the discretion to browse through images 602610 in application window 600 and decide whether to continue or terminate media player 612's activities.

FIG. 6(*b*) illustrates another arrangement of application window 600. Display organizer 508 creates another level of hierarchy and images 620–628. More particularly, each of images 620–628 represents a scene, and the scene corresponds to a sequence of frames about a common event or location. The sequence of frames further contains a plurality of shots and thus temporal snapshots. Using the movie "Titanic" as source video frames 106, image 620 may represent a scene corresponding to the video frames delineating a team of explorers searching for lost treasures in the Titanic. Image 628, on the hand, may represent a scene corresponding to the video frames describing the collision between the Titanic and an iceberg. When a user selects image 628, the related images of the temporal snapshots 630–636 then appear. The user can further view the collision scene by selecting the desired temporal snapshot image, each depicting a different stage of the collision.

This hierarchical method of viewing video clips is analogous to reading a book. Scenes in a video clip are similar to chapters in a book. Shots in a video clip are similar to paragraphs in a book. Images 620–628 and 630–636 represent one indexing scheme to these chapters and paragraphs. With this hierarchical navigation tool, display application 310, a user can preview relatively small but yet relevant portions of source video frames 106 before committing network resources to download or playback all of the frames. The user can also randomly access arbitrary video segments either during or after the downloading source video frames 106 from server 100.

Although the preceding discussion paragraphs describe specific modules of one embodiment of display application 310, such as input selector 502 and display organizer 508, and two display arrangements as shown in FIGS. 6(*a*) and 6(*b*), it should have been apparent to one ordinarily skilled in the art to design or implement display application 310 differently and still remain within its scope. For instance, functionality of input selector 502 and display organizer 508 may merge into one module. On the other hand, images 602–610 in FIG. 6(*a*) can appear vertically, and media player 612 can appear in another application window 600. Similarly, images 620–628 in FIG. 6(*b*) can appear horizontally and images 630–636 vertically. Media player 638 can also appear in another application window 600.

It should further be emphasized that network 104 can be any type of network connections between server 100 and client 102. Moreover, in one embodiment, RAPS supports multiple networking schemes. In one instance, server 100 and client 102 establish a two-way, point-to-point connection, or unicast networking. Specifically, client 102 receives a dedicated multimedia stream from server 100, and client 102 can communicate with server 100 directly.

In an alternative scheme, RAPS supports a multicast/unicast networking mechanism. More particularly, server 100 sends a single copy of information over the entire network to multiple desired clients such as client 102. Such type of networking is referred to as multicast networking. However, when one of the recipients of server 100's multimedia stream, like client 102, decides to review information which has already been presented, client 102 initiates the previously described requests by selecting one of the temporal snapshot images to server 100. This requires server 100 to extract temporal snapshots on the fly for live video as the video is being multicasted. For stored video, the temporal snapshots can be computed before the multicast session. This communication between client 102 and server 100 transforms the connection between the two to unicast networking. Thus, with unicast networking, server 100 can directly respond to client 102's demands, and client 102 can receive dedicated stream of multimedia data from server 100.

Thus, a method and apparatus of previewing and playing back source video frames has been disclosed. Although the present invention has been described particularly with reference to the figures, the present invention may appear in any number of systems, which provide the capability of previewing and playing back source video frames. It is further contemplated that many changes and modifications may be made by one of ordinary skill in the art without departing from the spirit and scope of the present invention.

What is claimed is:

1. A method comprising:

receiving temporal snapshots from a server, wherein each of said temporal snapshots corresponds to a segment of source video frames;

organizing hierarchically said temporal snapshots into scenes, wherein said scenes include a plurality of temporal snapshots;

generating first images to represent said scenes, wherein each of said first images corresponds to a scene;

displaying said first images;

generating, in response to a user's selection of one or more scenes, second images corresponding to temporal snapshots related to a selected scene;

displaying said second images;

requesting from said server, in response to generating said second images, said segments of source video frames corresponding to said second images;

storing a requested segment of sources video frames;

playing back, in response to said user's selection of one or more of said second images, a stored segment of source video frames corresponding to a selected second image; and requesting from said server, in response to said user's selection of said stored segment of source video frames, a next segment of source video frames that is temporally related to said segment of source video frames being played back.

2. The method according to claim 1, further comprising:

displaying said first images horizontally and said second images vertically or said first images vertically and said second images horizontally within an application window; and displaying a media playback window within said application window, wherein said media playback window plays back at least a portion of said source video frames.

3. The method according to claim 2, wherein said application window is a web browser window.

4. The method according to claim 1, further comprising:

displaying said first images horizontally and said second images vertically or said first images vertically and said second images horizontally within a first application window; and displaying a media playback window in a second application window, wherein said media playback window plays back at least a portion of said source video frames.

5. The method according to claim 4, further comprising:

displaying said second images after said user selects from said first images.

6. The method according to claim 4, wherein said first application window and said second application window are web browser windows.

7. The method according to claim 1, wherein said server communicates with said client through a unicast networking scheme.

8. The method according to claim 1, wherein said server transmits said video source frames to said client through a multicast networking scheme and in response to said user's selection of said images, transforms said multicast networking scheme to a unicast networking scheme.

9. The method according to claim 1, wherein said user selects said images with an input device.

10. A machine readable medium having embodied thereon instructions, which when executed by a server machine and a client machine, causes said client machine to:

receive temporal snapshots from said server machine, wherein each of said temporal snapshots corresponds to a segment of said source video frames;

organize hierarchically said tern oral snapshots into scenes, wherein said scenes include a plurality of temporal snapshots;

generate first images to represent said scenes, wherein each of said first images corresponds to a scene;

display said first images;

generate, in response to a user's selection of one or more scenes, second images corresponding to temporal snapshots related to a selected scene;

display said second images;

request from said server, in response to generating said second images, said segments of source video frames corresponding to said second images;

store said requested segments of source video frames;

play back, in response to said user's selection of one or more of said second images, a stored segment of source video frames corresponding to a selected second images; and request from said server, in response to said user's selection of said stored segment of source video frames, a next segment of source video frames that is temporally related to said segment of source video frames being played back.

11. The machine readable medium according to claim 10, wherein said instructions further comprise:

displaying said first images horizontally and said second images vertically or said first images vertically and said second images horizontally within an application window; and displaying a media playback window within said application window, wherein said media playback window plays back at least a portion of said source video frames.

12. The machine readable medium according to claim 10, wherein said instructions further comprise:

displaying said first images horizontally and said second images vertically or said first images vertically and said second images horizontally within a first application window; and displaying a media playback window in a second application window, wherein said media playback window plays back at least a portion of said source video frames.

13. The machine readable medium according to claim 12, wherein said first application window and said second application window are web browser windows.

14. The machine readable medium according to claim 10, wherein said instructions further comprise:

displaying said second images after said user selects from said first images.

15. The machine readable medium according to claim 10, wherein said server machine communicates with said client machine through a unicast networking scheme.

16. The machine readable medium according to claim 10, wherein said server machine transmits said video source frames to said client machine through a multicast networking scheme and in response to said user's selection of said images, transforms said multicast networking scheme to a unicast networking scheme.

17. The machine readable medium according to claim 10, wherein said application window is a web browser window.

18. The machine readable medium according to claim 10, wherein said user selects said images with an input device.

19. The machine readable medium according to claim 10, wherein said instructions that cause said client machine to play back said stored segment of source video frames comprise instructions that cause said client machine to play back said stored segment of source video frame during or subsequent to storing said requested segments of source video frames.

20. A system comprising:
   a server;
   a client coupled to said server through a network;
   a temporal snapshot generator to generate temporal snapshots from source video frames received by said server;
   a database to store said source video frames and said temporal snapshots, wherein each of said temporal snapshots corresponds to a segment of said source video frames;
   a display organizer to organize hierarchically said temporal snapshots into scenes, and generate first images corresponding to said scenes and, in response to a user's selection of one or more scenes, second images corresponding to said temporal snapshots related to a selected scene, wherein said scenes include a plurality of said temporal snapshots;
   a display application on said client to display one or more first images and one or more second images corresponding to one or more selected first images, wherein said display application allows a user of said client to play back, in response to said user's selection of one or more second images, a stored segment of source video frames corresponding to said one or more selected second images; and
   an intelligent prefetcher for requesting from said server, in response to said user's selection of said stored segment of source video frames, a next segment of source video frames that is temporally related to said segment of source video frames being played back.

21. The system according claim 20, wherein said display application further comprises:
   an application window for displaying said first images horizontally and said second images vertically or said first images vertically and said second images horizontally within said application window; and
   a media playback window within said application window, wherein said media playback window plays back at least a portion of said source video frames.

22. The system according to claim 21, wherein said application window is a web browser window.

23. The system according to claim 20, wherein said display application further comprises:
   a first application window for displaying said first images horizontally and said second images vertically or said first images vertically and said second images horizontally; and
   a second application window for displaying a media playback window, wherein said media playback window plays back at least a portion of said source video frames.

24. The system according to claim 23, wherein said first application window displays said second images after said user selects from said first images.

25. The system according to claim 23, wherein said first application window and said second application window are web browser windows.

26. The system according to claim 20, wherein said server communicates with said client through a unicast networking scheme.

27. The system according to claim 20, wherein said server transmits said video source frames to said client through a multicast networking scheme and in response to said user's selection of said images, transforms said multicast networking scheme to a unicast networking scheme.

28. The system according to claim 20, wherein said user selects said images with an input device.

29. The method of claim 1, wherein playing back said stored segment of source video frames comprises playing back said stored segment of source video frame during or subsequent to storing said requested segments of source video frames.

* * * * *

UNITED STATES PATENT AND TRADEMARK OFFICE
CERTIFICATE OF CORRECTION

PATENT NO. : 6,711,741 B2
DATED : March 23, 2004
INVENTOR(S) : Yeo

It is certified that error appears in the above-identified patent and that said Letters Patent is hereby corrected as shown below:

Column 8,
Line 7, delete "tern oral" and insert -- temporal --.

Signed and Sealed this

Third Day of August, 2004

JON W. DUDAS
*Acting Director of the United States Patent and Trademark Office*